United States Patent

Pericic et al.

[11] Patent Number: 5,923,467
[45] Date of Patent: Jul. 13, 1999

[54] BINOCULAR BENT-AXIS LOUPES

[75] Inventors: Ljubomir Pericic, Alphington; Gerard W. Crock, Kew; Hugh R Taylor, Balwyn, all of Australia

[73] Assignee: The University of Melbourne, Victoria, Australia

[21] Appl. No.: 08/244,554
[22] PCT Filed: Nov. 26, 1992
[86] PCT No.: PCT/AU92/00634
§ 371 Date: Sep. 1, 1994
§ 102(e) Date: Sep. 1, 1994
[87] PCT Pub. No.: WO93/11454
PCT Pub. Date: Jun. 10, 1993

[30] Foreign Application Priority Data

Nov. 28, 1991 [AU] Australia .................. PK9740

[51] Int. Cl.⁶ .................. G02B 27/02; G02B 7/02; G02B 23/02; G02C 1/00
[52] U.S. Cl. .................. 359/411; 359/412; 359/385; 359/368; 359/409; 359/482; 351/158; 351/159
[58] Field of Search .................. 359/411, 412, 359/431, 413, 414, 375, 377, 385, 368, 409, 480, 481, 482, 471, 473, 475, 476, 477, 478, 479, 647, 661; 351/158, 159

[56] References Cited

U.S. PATENT DOCUMENTS

| | | | |
|---|---|---|---|
| 3,049,972 | 8/1962 | Malinowski | 359/431 |
| 3,847,470 | 11/1974 | Dederer et al. | 351/6 |
| 3,909,106 | 9/1975 | Buhler | 359/377 |
| 4,152,054 | 5/1979 | Leiter | 354/23 |
| 4,251,128 | 2/1981 | Feinbloom | 359/385 |
| 4,264,122 | 4/1981 | Schmidt et al. | 359/412 |
| 4,302,087 | 11/1981 | Reinheimer et al. | 354/79 |
| 4,303,340 | 12/1981 | Hoffman | 356/372 |
| 4,652,094 | 3/1987 | Kitajima | 359/375 |
| 4,704,000 | 11/1987 | Pekar et al. | 359/431 |
| 4,795,235 | 1/1989 | Spitzberg | 351/158 |
| 4,991,947 | 2/1991 | Sander et al. | 359/375 |
| 5,020,891 | 6/1991 | Lichtman et al. | 359/431 |
| 5,191,470 | 3/1993 | Wickholm et al. | 359/375 |
| 5,204,489 | 4/1993 | Pellarin et al. | 359/431 |

FOREIGN PATENT DOCUMENTS

| | | | |
|---|---|---|---|
| 680766 | 9/1939 | Germany | 359/431 |
| 447299 | 8/1950 | Italy | 359/431 |
| 187311 | 10/1984 | Japan | 359/431 |
| 322460 | 12/1929 | United Kingdom | 359/423 |

OTHER PUBLICATIONS

Harris, Optical Transducer, Oct., 1960, pp. 55–56.

Primary Examiner—Cassandra Spyrou
Assistant Examiner—Mohammad Y. Sikder
Attorney, Agent, or Firm—Foley & Lardner

[57] ABSTRACT

Optical loupes comprise a frame supporting two optical devices, each of which has an ocular and an objective. The frame has side arms or stems and a bridge for enabling the frame to be worn like a pair of spectacles, whereby the optical devices are located immediately in front of the eyes of the viewer. The ocular and the objective each have an optical axis. The optical axis of the ocular and the optical axis of the objective intersect at an angle of about 135°, and a Schmidt prism redirects light from the objective to the ocular in each case. A light source is provided on the frame between the optical devices and provides a gradually diverging light beam to illuminate an object being reviewed. The optical axes of the respective objectives converge at the object being reviewed. The loupes allow the user to observe at a level below his or her normal line of sight while maintaining the head in an upright position.

15 Claims, 3 Drawing Sheets

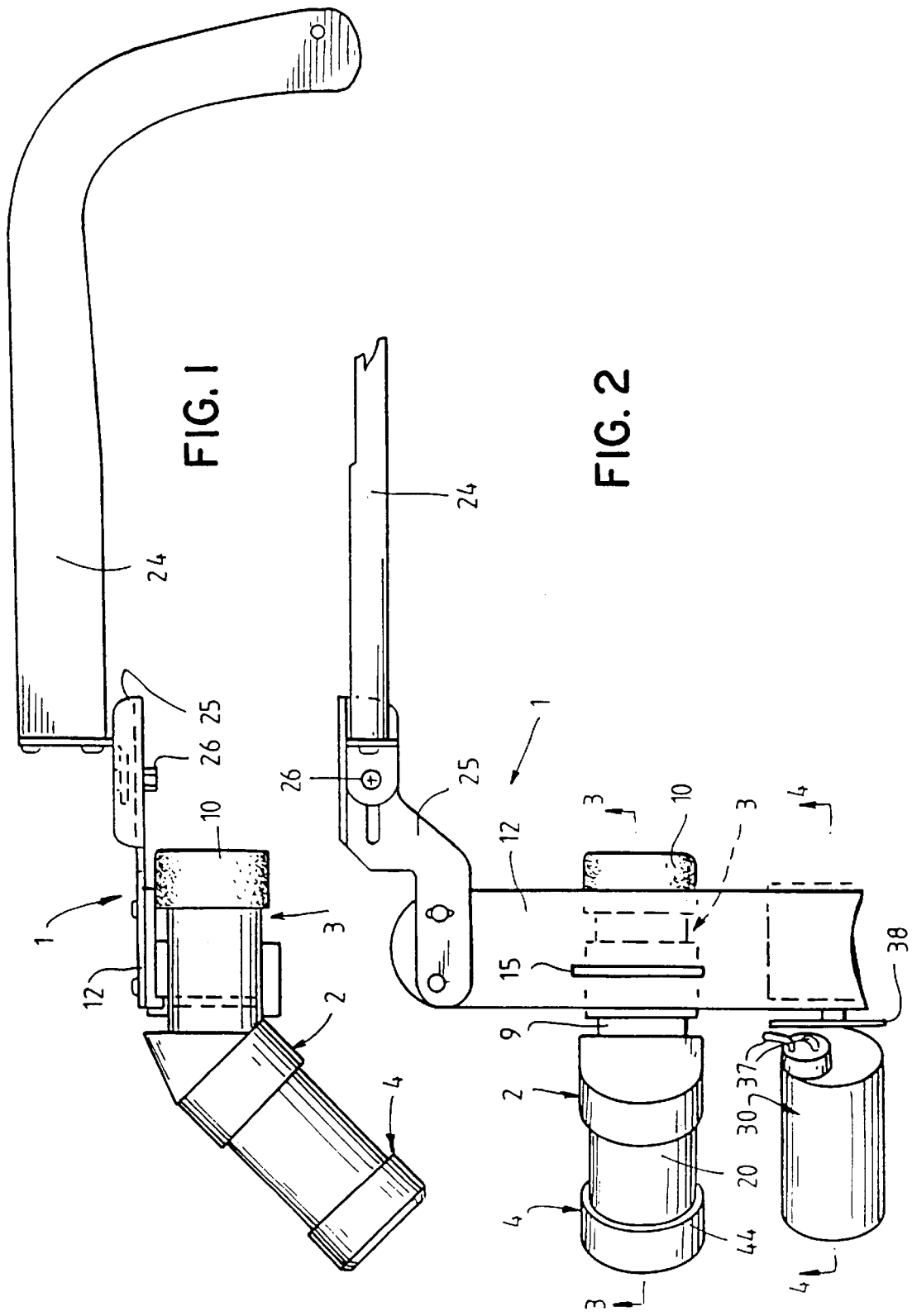

BINOCULAR BENT-AXIS LOUPES

FIELD OF THE INVENTION

This invention relates to binoculars or loupes and more particularly to loupes which allow a viewer to closely and conveniently observe an object which is being manipulated by the hands of the viewer below the normal level of eyesight.

BACKGROUND OF THE INVENTION

When performing surgery, for example, a surgeon relies on a high level of eye hand co-ordination generally with a small margin for error and so to enhance the precision and accuracy of the surgery it is necessary to magnify the region of the operation. Operating optical microscopes which comprise optical devices mounted on fixed stands have been used by surgeons for this purpose. However the field of view of these microscopes is set at the beginning of an operation and is not easily reset if a surgeon needs to alter the field of view to gain a better perspective of the operation or of the operating region.

It is also common for surgeons to wear small head mounted binoculars or loupes to magnify their field of view. However as the level of an operation is below the normal level of eyesight of the surgeon, the head of the surgeon must be inclined to enable him to watch and co-ordinate his hands. During long operations even a slight inclination of the head can overwork the muscles of the neck discomforting the surgeon and providing an additional unnecessary distraction. This problem is compounded by the weight of the head mounted loupes.

To allow a surgeon to sit and concentrate in one position for a long length of time and reduce the stress on the muscles of the neck it is preferable that the head and neck of the surgeon be in an upright aligned position so that the surgeon's line of sight is straight ahead. However due to the level of an operation this position is not possible with existing loupes.

Furthermore this problem is not exclusively confined to those in the surgical profession. In fact any person such as a jeweller who is using existing loupes and manipulating very small objects for any length of time will encounter the same problems associated with inclination of the head, as the surgeon.

It is an object of the present invention to provide an apparatus which allows a person to view and co-ordinate his/her hands below the normal line of sight without having to incline his/her head and also to allow the person to readily change the field of view being magnified.

SUMMARY OF THE INVENTION

Accordingly the invention provides optical loupes comprising a pair of optical devices (2) mounted on a frame for attachment on the head of a user whereby each optical device is in proximity to a respective eye of the user, characterised in that, each said optical device has an ocular (3), and an objective (4) which defines a field of view, said ocular and objective each has an optical axis (41, 42), respectively, the optical axis (42) through the objective intersects with the optical axis (41) through the ocular in each case, and light transfer means (23) is located between said ocular and objective for redirecting light from the objective to the ocular whereby an object which appears in the field of view of the objective is capable of being viewed through the ocular.

By providing an apparatus whereby the optical axes of the objective and ocular intersect rather than project co-linearly, the light path from an image below the normal line of sight can be projected through the objective and redirected through the ocular to the eye of the viewer while the viewer is looking straight ahead. This allows the viewer to observe an object below the normal line of sight without the need to incline his/her head. Furthermore as the apparatus, in use, is attached to the head of the viewer the field of view observed can be changed simply by the viewer moving the position of his/her head.

BRIEF DESCRIPTION OF THE DRAWINGS

The forgoing and other features objects and advantages of the present invention will become more apparent from the following description of a preferred embodiment in which;

FIG. 1 is a side elevational view of an embodiment of the apparatus in accordance with the invention, FIG. 2 is a partial plan view of the embodiment shown in FIG. 1.

DETAILED DESCRIPTION OF PREFERRED EMBODIMENTS

Figure 3:
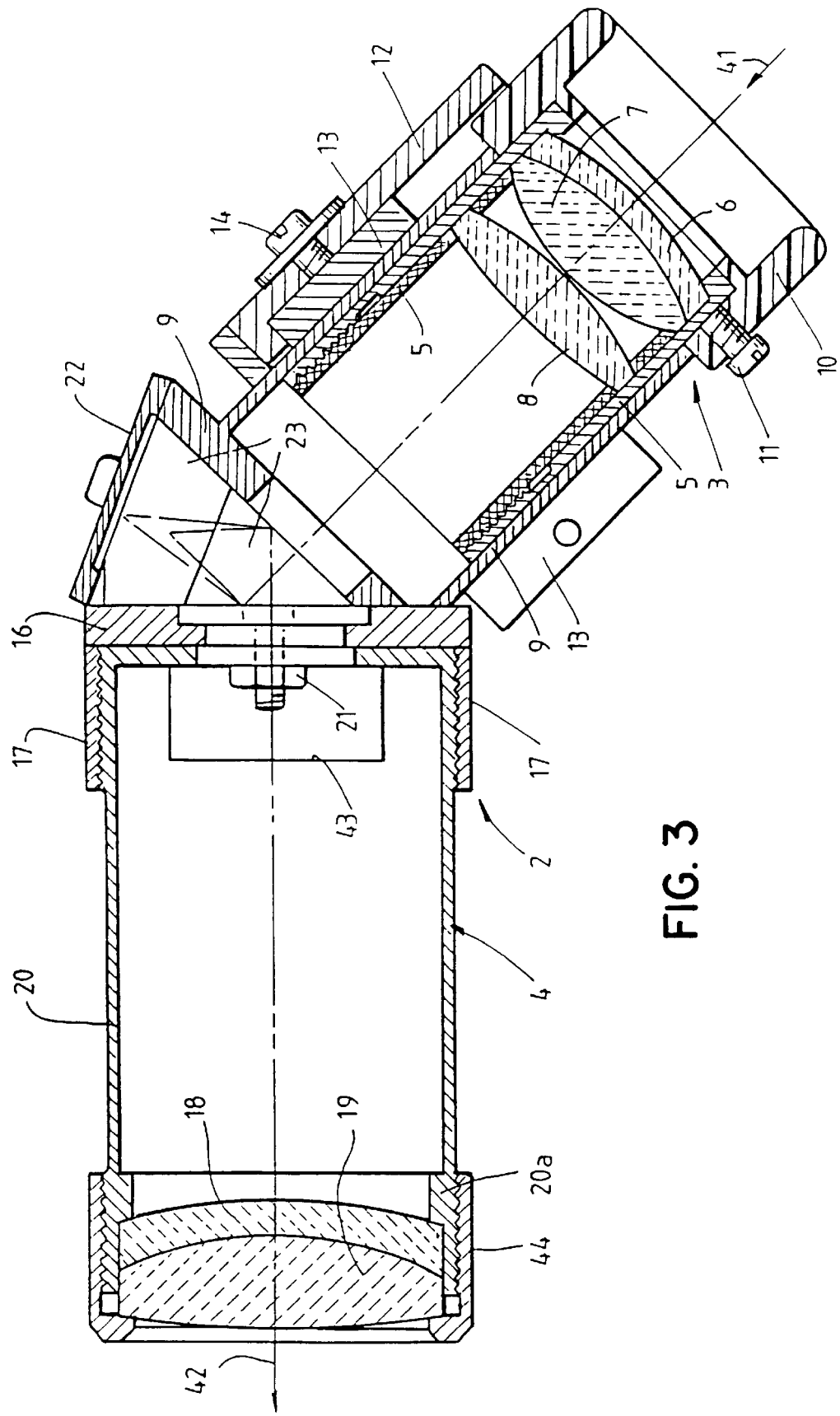
FIG. 3 is a sectional view of one of the optical devices through line 3—3 of FIG. 2.

The apparatus 1 in accordance with the embodiment is shown as having two optical devices 2 each with an ocular 3 and an objective 4. The ocular 3 comprises a metal tube. 5 which contains ocular lenses 6, 7 and field lens 8. Metal tube 5 Is slidably mounted within ocular housing 9. An eye guard or hood 10 is fitted to the proximal end of tube 5 and is held in position by thumb screw 11.

An aluminum frame 12 is fastened to a support collar 13 of the ocular 3 by means of a locking screw 14. The locking screw passes through an elongate hole 15 in the frame 12 which allows the ocular a limited amount of lateral movement on the frame. Prior to the tightening of the locking screw 14 the interpupillary distance between the two optical devices can be set by moving the locking screw 14 within the elongate hole 15.

The ocular housing 9 is connected to plate assembly 16 plate assembly 16 is locked in position on the end of tube 20 by locking nut 21 which allows for optical axis alignment. Attached to plate assembly 16 is objective mounting collar 17. A window 43 in tube 20 is provided to facilitate the optical axis alignment.

The objective comprises objective lenses 18, 19 in the distal end of tube 20 which is mounted in objective mounting collar 17. Objective cover 44 is screwed onto the distal end 20a of the tube 20 and is provided to reduce the amount of refracted light entering the objective. A further cover 22 is provided to enclose the optical path within the optical device.

To allow a viewer looking through the ocular to view an object below his normal level of sight without inclining his head the respective optical axis 41 through the ocular lens and the optical axis 42 through the objective lens intersect at an angle less then 180° and preferably greater than 90° and more preferably at an angle in the range 120°–150°, wherein ocular axis 41 is in line with the normal visual axis of the human user when looking straight ahead when the frame is attached to the head of the human user. In the preferred embodiment the angle of intersection is about 135°. To redirect light from the objective to the ocular a light redirection means in the form of a Schmidt prism 23 is provided.

As discussed above the optical device 2 is mounted onto a frame 12 and is preferably used in pairs to provide binocular vision. To position and support the optical devices in proximity to the eyes of the viewer, stems 24 are connected to the frame 12 by mountings 25. The stems attach to the mountings by pivot screws 26 and are slidably adjustable within the mounting 25. In use the stems 24 extend from the frame 12 along each side of the head of the viewer towards and over the ears in a similar way to the stems or side arms of spectacles which support and position the spectacles on a user. The frame 12 also has a nose support or bridge 44 for supporting the frame on the nose of a viewer again in a similar manner to spectacles.

While this embodiment relies on a spectacle frame type arrangement which in use positions and supports the optical devices in proximity to the eyes of the viewer, it would be appreciated by those skilled in the art that other similar attachment means could be used provided they allow the viewer to change the field of view through the objective by movement of the position of the viewers head rather than having to undertake a lengthy adjustment procedure.

Once the interpupillary distance between the optical devices is set and the stem 24 and mounting 25 adjusted to correctly position the optical devices on the viewer it is essential that the optical devices are adjusted to ensure that the optical axes of each optical device converge at a central point which is at the working distance of the apparatus. This working distance will generally be within arms length of the viewer and below the normal level of sight of the viewer. Once the actual alignment is correctly set the optical devices are locked into position on frame 12 by the locking screw 14 on collar 13.

To ensure that sufficient light is provided at the working distance the frame is provided with a lamp assembly 30. The lamp assembly is mounted on the frame between the optical devices and is co-planar (in a longitudinal plane) with the optical devices.

The location of the lamp assembly 30 on the frame midway between the optical devices provides what is termed in the art true co-axial illumination. In other words the light beam and the vision of the user are co-focused and over the area of vision this is termed co-axial illumination. This is very important in intraocular surgery as it produces the red reflex which enables the surgeon to view things which are transparent when performing delicate eye operations. Another way of describing the term co-axial illumination is that the light beam and the point where the user's vision is focused are always co-incident so that when the user changes the field of vision the light beam covers the new object. In the general sense the light beam is co-axial with the converging field of vision.

Figure 4:
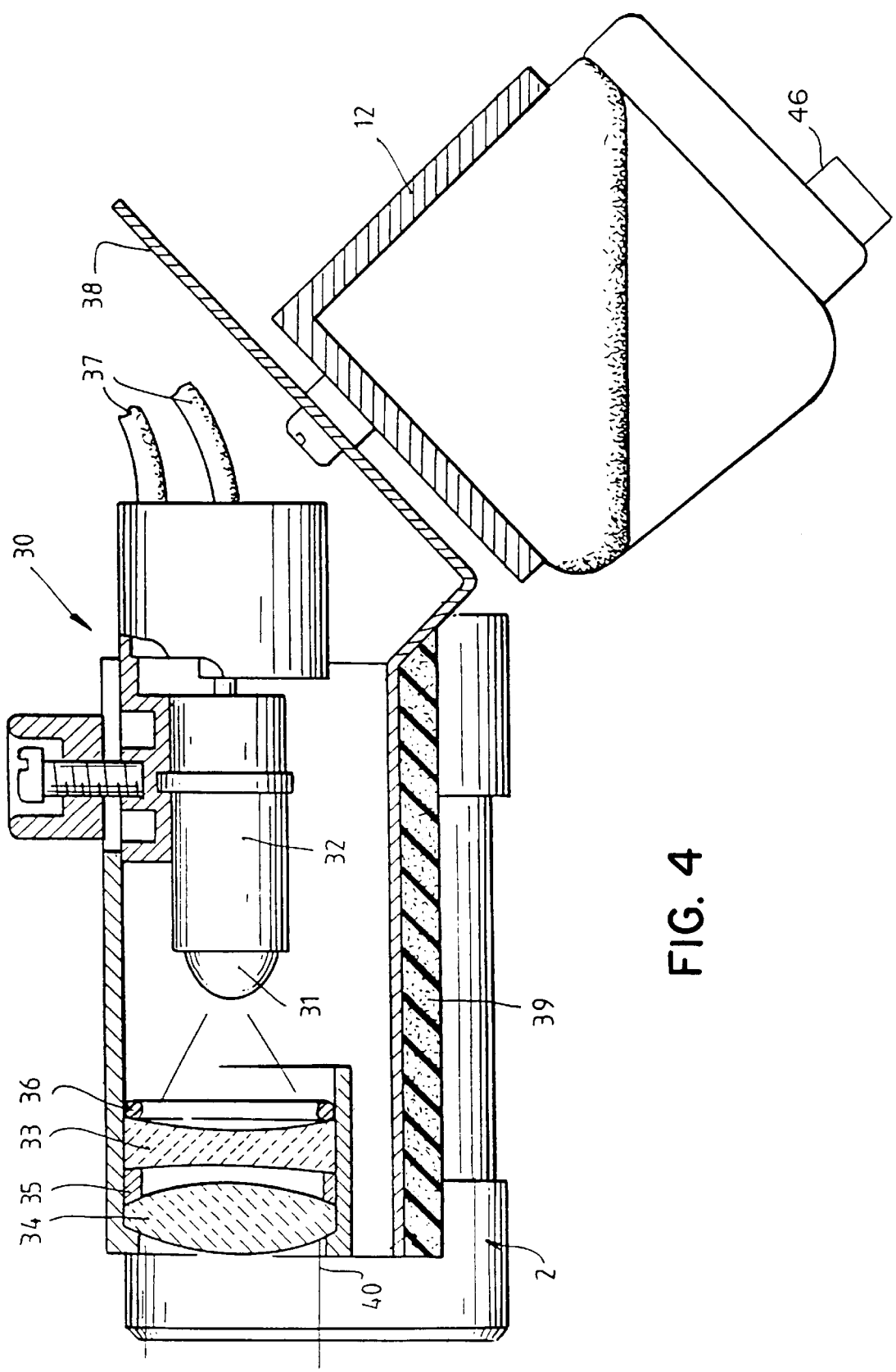
FIG. 4 is a sectional view of a central light through line 4—4 of FIG. 2.

The lamp assembly 30, shown in FIG. 4 is mounted on frame 12 and comprises a lamp 31 fitted into a brass socket 32 which is mounted on the wall of the lamp assembly. The lamp 31 projects light through a bicylindrical lens 33 which is spaced from a condensing lens 34 by spacers 35, 36 to produce a gradually diverging light beam out of the end 40 of the light assembly.

The lamp is powered by a twelve volt local power source (not shown) which is connected to the socket by leads 37. The local power source is preferably a battery power pack which is carried by the viewer. The lamp assembly is connected to the frame 12 by an aluminum member 38 which also acts as a shield to the viewer from the heat generated by the lamp. To further insulate the viewer from the heat generated, cork compound heat shield 39 is also provided.

As would be appreciated by those skilled in the art the apparatus in accordance with the invention enables a surgeon, jeweller or the like artisan to observe or operate at a level below his/her normal line of sight while maintaining his/her head in an upright position and also allows the viewer to change the field of view by moving the position of his/her head. The invention therefore provides an improved apparatus which overcomes the deficiencies of the prior art.

What is claimed is:

1. Binocular, bent-axis optical loupes, comprising:
    a frame including means for attaching the frame on the head of a human user;
    a pair of optical devices mounted on the frame at positions proximate a respective eye of a human user, wherein each such device includes an ocular having an ocular axis, which ocular axis is in line with the normal visual axis of the human user when looking straight ahead when the frame is attached to the head of the human user, an objective which defines a field of view outside the normal visual axis of the human user when looking straight ahead, the objective having an objective axis, the objective axis intersecting the ocular axis at an obtuse angle which angle opens toward the human user when the frame is attached to the head of the human user, and a light transfer device located between the ocular and the objective where the objective and ocular axes intersect, which light transfer device redirects light from the objective to the ocular, whereby an object which appears in the field of view of the objective is capable of being viewed through the ocular; and
    a light source provided on the frame between the optical devices, the light source providing a gradually diverging beam directed to illuminate the object being viewed in a manner which gives the effect of true co-axial illumination.

2. The optical loupes of claim 1, wherein the obtuse angle is in the range of 120° to 150°.

3. The optical loupes of claim 2, wherein the objective axes of the optical devices converge at an object being viewed.

4. The optical loupes of claim 3, wherein the light beam and the objective axes are focused on the object being viewed.

5. The optical loupes of claim 4, wherein the device for attaching the frame on the head of a human user comprises a pair of respective side arms and a nose support whereby the optical loupes are worn similar to a pair of spectacles with each ocular proximal to a respective eye of the human user.

6. The optical loupes of claim 1, wherein the device for attaching the frame on the head of a human user comprises a pair of respective side arms and a nose support whereby the optical loupes are worn similar to a pair of spectacles with each ocular proximal to a respective eye of the human user.

7. The optical loupes of claim 5, wherein the light transfer device is a Schmidt prism.

8. The optical loupes of claim 7, wherein the objective axis and the ocular axis of each optical device intersect at an angle of about 135°.

9. The optical loupes of claim 1, further comprising means for making limited lateral adjustments of the optical devices on the frame, whereby the optical loupes may be adjusted to an interpupillary distance of the human user.

10. The optical loupes of claim 9, wherein the means for making limited lateral adjustments of the optical devices includes locking screws for locking the optical devices in position on the frame.

11. The optical loupes of claim 1, wherein each ocular includes a pair of ocular lenses and a field lens, and each objective includes a pair of objective lenses located at a distal end of the objective.

12. The optical loupes of claim 11, wherein the light transfer device comprises a prism disposed at a position spaced from the ocular lenses and field lens and from the objective lenses.

13. The optical loupes of claim 12, wherein each optical device further comprises a first tube in which the ocular lenses and field lens are disposed, and a second tube in which the objective lenses are disposed.

14. The optical loupes of claim 13, wherein the objective lenses are disposed at a distal end of the second tube, and a window configured to facilitate optical axis alignment is provided in a side of the second tube.

15. The optical loupes of claim 14, wherein the light source is positioned on the frame midway between the optical devices.

* * * * *